(No Model.) 2 Sheets—Sheet 2.
S. B. JENKINS.
INDUCTION SYSTEM FOR ELECTRICAL HEATING.
No. 494,295. Patented Mar. 28, 1893.
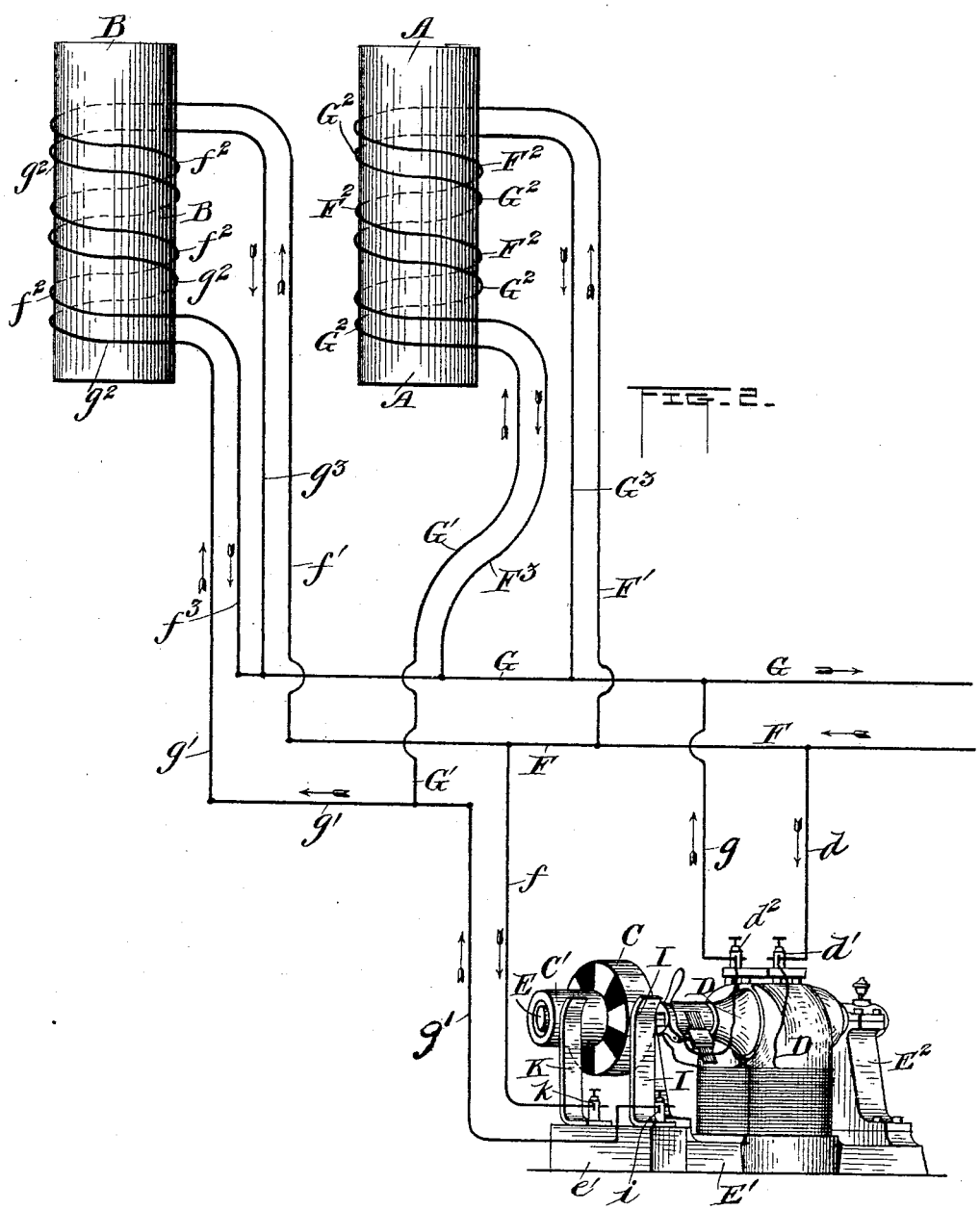
Witnesses
Severance
W. Harvey Muzzy
Inventor
Samuel B Jenkins
by W. H. Babcock
Attorney

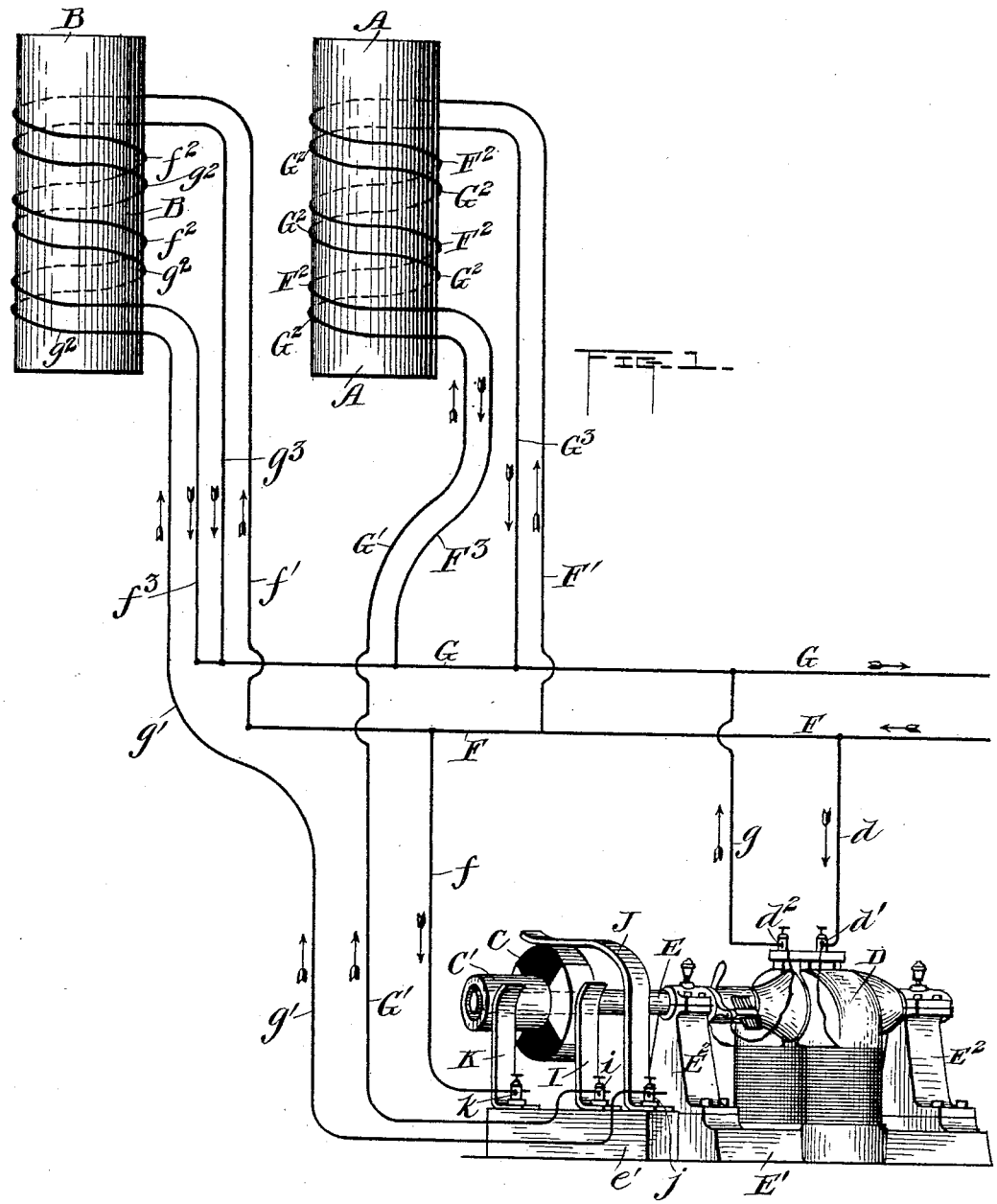

UNITED STATES PATENT OFFICE.

SAMUEL B. JENKINS, OF BOSTON, MASSACHUSETTS, ASSIGNOR TO THE BUTTERFIELD-MITCHELL ELECTRIC HEATING COMPANY, OF SAME PLACE.

INDUCTION SYSTEM OF ELECTRICAL HEATING.

SPECIFICATION forming part of Letters Patent No. 494,295, dated March 28, 1893.

Application filed May 28, 1892. Serial No. 434,712. (No model.)

*To all whom it may concern:*

Be it known that I, SAMUEL B. JENKINS, a citizen of the United States, residing at Boston, in the county of Suffolk and State of Massachusetts, have invented certain new and useful Improvements in Electrical Induction Systems for Heating and other Purposes; and I do hereby declare the following to be a full, clear, and exact description of the invention, such as will enable others skilled in the art to which it appertains to make and use the same.

The primary object of this invention is to utilize for practical purposes the reversed induced current which is set up in a conductor when the primary current is interrupted; the said conductor being wound on a magnetic core and a second conductor being wound on the same core reversely with respect to its length for the passage of a second current of electricity continuously in an opposite direction from end to end of the core in order to prevent sparking when the circuit of the first current is thus broken. As stated in *Thompson's Electro-Magnet*, a continuous current will prevent sparking when another current is interrupted which passes around the same core in this end for end fashion, a reversed induced current will be set up in the conductor of the interrupted current by such interruption; and a certain evolution of heat will then take place, in excess of the normal heat of resistance, and probably due to the said reversed induced current; this additional calorific effect being known as the heat of hysteresis. The phenomenon causing it is called the magnetic lag.

A chief feature of the present invention consists in a method and means hereinafter set forth of utilizing this heat of hysteresis in a heating system for buildings. But the induced current above described may be applied to many other uses, the same series of conductors and currents being in substance adopted. The said induced current is well suited to such applications, being of relatively high electro-motive force, though less in volume than the primary current which creates it.

My said invention then consists in a system of electrical distribution for attaining these ends, and a method and means of electric heating whereby it is applied to one especial practical use; all substantially as hereinafter more particularly set forth and claimed.

In the accompanying drawings Figure 1 represents the cores, coils, conductors, commutator and motor of one combination of devices embodying my invention; and Fig. 2 represents the same parts in a second combination or arrangement.

These views are taken partly in perspective, partly (as to the wires) in diagram. The form shown in Fig. 1 makes the intermittent circuit through each heater separately; that shown in Fig. 2 makes it through all the heating coils collectively.

A and B designate respectively the magnetic cores, of which only two are shown, although they may be of any number.

C designates a commutator, D the motor which rotates it, E the common shaft of these two parts, E' their bed plate and E² their supporting standards and bearings. The commutator may consist as shown of a disk having alternating insulated and conducting segments and a projecting conducting cylinder C'. The motor may be of any known construction suitable to rotate the said commutator or to oscillate it.

F and G designate two wires which extend to a source of electricity completing the circuits. From wire F a short wire $d$ extends to a binding post $d'$ of the motor and from the wire G a short wire $g$ extends to the binding post $d^2$ of the motor. Whether the circuit through the commutator is interrupted or not, the circuit through the motor is operative, following these wires $d\ g$ and their necessary connections, as the arrows indicate. The wire F is connected to a branch wire F', which extends to the upper end of core A and winds down on it as shown from left to right, forming a helix F², from which a wire F³, preferably integral therewith, extends to the wire G. In like manner the branch wire $f'$ extends from wire F, winds down on core B forming helix $f^2$, and returns as wire $f^3$ to the wire G. The winding for each helix is much closer than that shown, and suitably insulated. This applies also to the helices yet to be described. There is a similar winding for each core, and a continuous current flows through all, dividing between the branches in proportion to their resistance as usual. Preferably this is nearly equal in each instance.

I J and K, as shown in Fig. 1, designate three contact plates, springs or brushes mounted on an insulating part or attachment $e'$ of the said base E', and provided with binding screws $i$ $j$ $k$. The two former brushes bear on the periphery of the disk part of the commutator at points some distance apart. The brush K bears against the drum or cylindrical extension C' of the same. From the binding post $i$ of brush or contact spring I a wire G' extends to the lower end of the core and winds up the latter from left to right in a spiral line parallel with helix or coil $F^2$ forming a similar helix or coil $G^2$. Thence it returns as wire $G^3$ to wire G. In like manner wire $g'$ from brush J runs to and around core B forming helix $g^2$ and returns as wire $g^3$ to wire G. A wire $f$ extends from binding post $k$ of contact spring or brush K to wire F.

When the commutator is in the position of rotation indicated by Fig. 1, the circuit, as shown by the arrows, will be from wire F through wire $f$, brush K extension C' commutator C brush I wire G' helix $G^2$ and wire $G^3$ to wire G and the source of electricity. If the commutator be turned far enough to bring the brush J into contact with a conducting segment of the disk of the commutator and leave the brush I against an insulating segment of the latter the circuit is as before except that wire $g'$ helix $g^2$ and wire $g^3$ are substituted for the corresponding conductors before mentioned. In either case the current is in the reverse direction with respect to the ends of the core from that of the continuous current first described. The rotation or oscillation of the commutator by the motor causes a rapid making and breaking of circuits successively bringing each coil or helix controlled thereby into the electrical circuit. As often as the current is interrupted in shifting to another helix an induced current is created in the same wire but in the reverse direction and as a consequence heat is evolved beyond the heat of wire resistance. This heat of hysteresis as it is called becomes available for heating the rooms or other places in which the cores are respectively situated. Thus each core with its appurtenances becomes an electro-magnetic heater operating in accordance with the principle above stated. This is equally true of the construction and arrangement shown in Fig. 2 which differs from Fig. 1 only in connecting the wire G' to the wire $g'$ and the latter to the brush or contact spring I, the brush J being dispensed with. When the commutator is in the position as shown in Fig. 2, for the brush I to bear against one of the insulated parts or segments of it the circuit is broken through the said commutator and both of the coils or helices $G^2$ $g^2$, and there is a circuit through the motor only and a circuit through the coils $F^2$ $f^2$. When the action of the latter has turned the said commutator far enough for one of the conducting segments thereof to be in contact with the said brush I the circuit is closed through both of these coils simultaneously or as many of them as there may be. Thus there is a rapidly interrupted current set up through all the coils G' $g^2$, &c., of the series and consequently a reversed induced current is created through the same. The continuous current through the helices $F^2$ $f^2$ in the opposite direction with respect to the length of the cores A B, prevents sparking in the interrupted circuit as before explained.

Many other arrangements for connecting the several heaters in circuit with the commutator or some equivalent device may be adopted, those shown and described herein being intended merely to present two very convenient ones intended respectively to switch the current from coil to coil, never passing it through more than one coil or helix at a time, and to admit it to, or cut it off from, the entire series simultaneously. Of course the induced current thus set up may be applied to other than heating purposes.

Having thus described my invention, what I claim as new, and desire to secure by Letters Patent, is—

1. A series of cores arranged individually at the points where an induced current and its results are needed, in a combination with a series of coils or helices wound thereon and forming part of a circuit for a continuous current, a second series of coils or helices wound on the same cores and forming part of the circuit for an interrupted current, and mechanism for automatically interrupting the latter current either for the individual coils in succession or for the series taken together in order to create an induced current substantially as set forth.

2. The method of generating heat by electricity and applying the same to a heating system for various points or apartments consisting in sending a continuous current and an intermittent current in opposite directions with respect to the length of the cores on which they are wound, the interruption of the latter current generating a reverse induced current and producing heat thereby known as the heat of hysteresis while the continuous current first mentioned prevents sparking at such interruptions substantially as set forth.

3. A motor and commutator in combination with a series of magnetic cores, two series of coils or helices wound thereon, conductors for making circuit for a continuous current through the first series of helices and conductors and contact pieces for making intermittent circuit through the helices of the second series individually or collectively by means of the said commutator the two currents entering at opposite ends of the said helices substantially as set forth.

In testimony whereof I affix my signature in presence of two witnesses.

SAMUEL B. JENKINS.

Witnesses:
EDWIN W. PIERCE,
PELATIAH R. TRIPP.